May 16, 1950 N. L. OATES 2,507,810
FISH LOCATING MEANS FOR FEEDER TABLES
Filed Jan. 18, 1946 5 Sheets-Sheet 3

INVENTOR.
NORFORD L. OATES
BY
Reynolds+Beach

May 16, 1950          N. L. OATES          2,507,810

FISH LOCATING MEANS FOR FEEDER TABLES

Filed Jan. 18, 1946          5 Sheets-Sheet 4

INVENTOR.
NORFORD L. OATES
BY
Reynolds & Beach

Patented May 16, 1950

2,507,810

UNITED STATES PATENT OFFICE 2,507,810

FISH LOCATING MEANS FOR FEEDER TABLES

Norford L. Oates, Seattle, Wash., assignor to Smith Cannery Machines Company, Seattle, Wash., a corporation of Washington Application January 18, 1946, Serial No. 641,893

21 Claims. (Cl. 17—4)

The accurate beheading of fish, such as salmon, in preparation for canning them, is an important economic factor, in order, on the one hand, to conserve as much of the edible flesh as possible, up to the pectoral girdle, and, on the other hand, to avoid the inclusion of appreciable quantities of bony structure, such as the pectoral girdle, the gill case, or the gill cover, with consequent downgrading of the pack. The desideratum is to behead the fish just behind the pectoral girdle, and since the pectoral girdle or the other bony excrescences named can be engaged, particularly from behind, by an edge which depresses the flesh and which moves relatively towards the fish's snout, these bony excrescences furnish a convenient gauge point.

Various devices and methods have been proposed for employing such engagement to locate relatively the fish and the beheading knife, so that the fish is moved into, or beheading is caused to occur when the fish is in correct registry with the beheading point. Such means are independent of the nature of the beheading action, that is, whether the knife is stationary and the fish is moved past the knife, or whether the knife moves relatively to the fish, and whether, in the latter case, the knife is reciprocatory or rotary, or if rotary whether it moves in a cylindrical or planar path. The principle of effecting proper registry between the fish and the beheading knife is, broadly speaking, not dependent upon the employment of a particular fish-advancing means, yet certain types of fish-advancing means lend themselves more readily than others to particular means for effecting shifting of the fish into correct registry with the beheading point as they advance thereto.

Fish locating means and fish feeding means of various types are shown in my copending applications Serial Nos. 430,367, filed February 11, 1942, 442,706, filed May 12, 1942, and 629,979, filed November 21, 1945. The present invention is concerned primarily with a fish feeding or advancing means which in itself incorporates means to shift the fish transversely of its path of advance, to dispose it accurately in registry with the beheading point, in distinction to prior devices wherein the means to shift the fish thus were separate from, even though coordinated with, the feeding or advancing means.

The provision of means so arranged, is the primary object of the present invention, although, in common with all other such inventions, the broad aim is to effect accurate and automatic positioning of individual fish, of random sizes, fed at a rapid rate, and handled somewhat carelessly, with relation to a beheading knife towards which they are advancing. For a detailed discussion of the conditions prevailing in such work, reference is made to the specifications of said copending applications.

More particularly, it is an object of this invention to support each individual fish, as it advances towards the beheading point, in part at least by a transversely shiftable plate or platform, whereby the fish may be bodily and positively carried in the direction of its own length, in the one case, towards its snout end, to leave it at its point of farthest shifting in correct registry; and in another case, towards its tail end; and in both cases engaging the fish's bony excrescence in the vicinity of its pectoral girdle either to move it, or to halt its tailward shifting, and by such engagement to determine its correct registry.

It is also an object to provide means of the nature indicated, which travels with the feed means, and which is susceptible of control by cam means fixed along its path of advance.

The engagement from below can normally be relied upon to effect the desired shifting of the fish, but in order to doubly assure the desired result, it is an object to provide duplicate means, movable above the supporting means in a parallel path, and similarly controlled, to engage the corresponding upper bony excrescence, and to be self-adjusting to random sizes of fish.

With these and other objects in mind, as will appear hereinafter, the present invention comprises the novel fish-locating means as shown in the accompanying drawings, as described in this specification, and as defined in the claims at the end hereof.

The drawings illustrate generally a preferred construction and arrangement, in two alternative forms.

Figure 1:
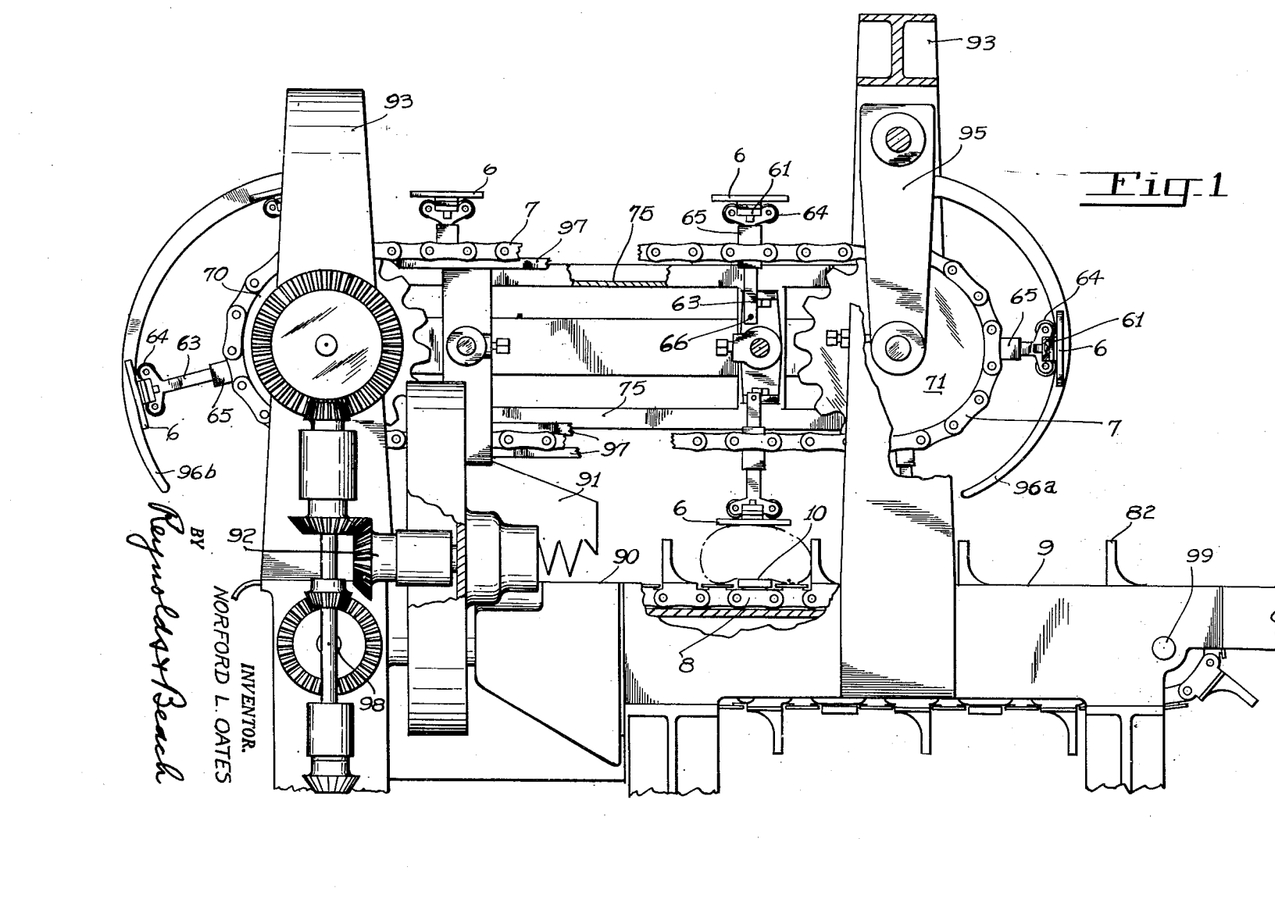
Figure 1 is a side elevation, with parts broken away, of a feeder table incorporating one form of the invention.
Figures 2, 8:
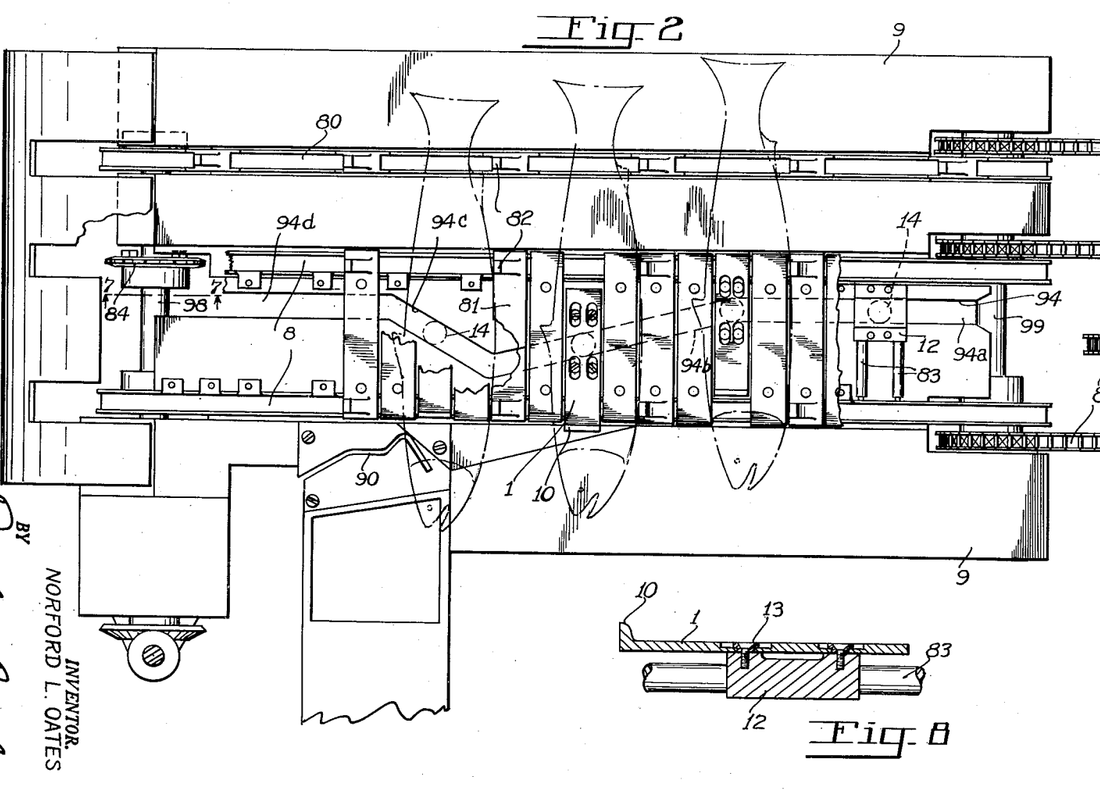
Figure 2 is a plan view thereof.
Figure 8 is a detail section of an individual fish-supporting plate and its associated feed means.
Figure 3:
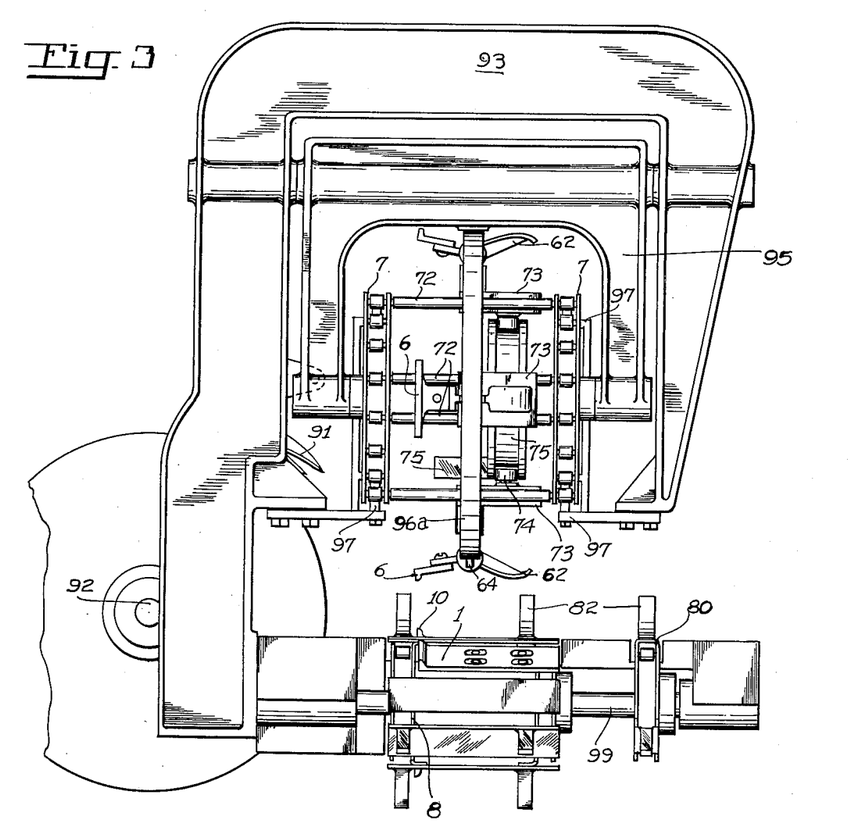
Figure 3 is an elevation thereof from the feed end.
Figure 4:
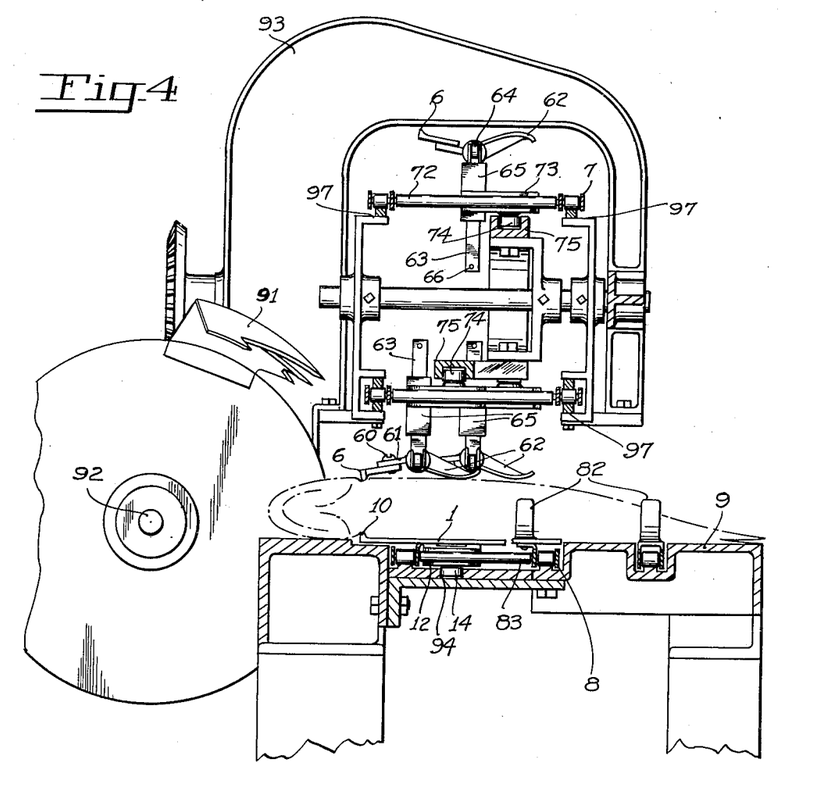
Figure 4 is a transverse section near the beheading point.
Figure 5:
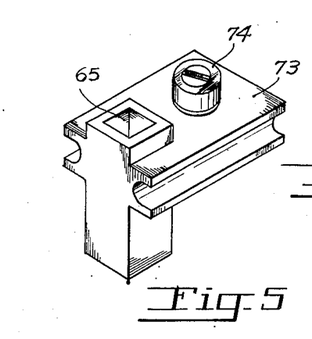
Figure 5 is an isometric view of the vertical guide.
Figure 6:
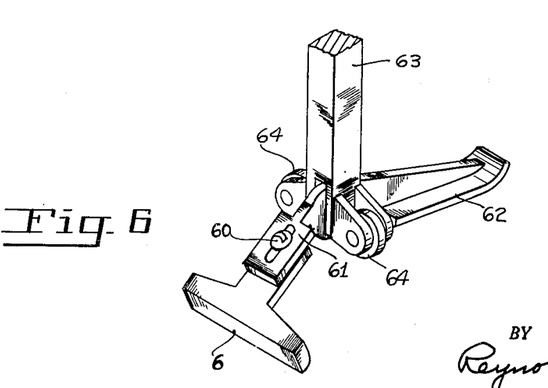
Figure 6 is a similar view of the upper fish-engaging means, as employed in the upper shifting mechanism of the form shown in Figures 1, 2, 3, and 4.
Figure 7:
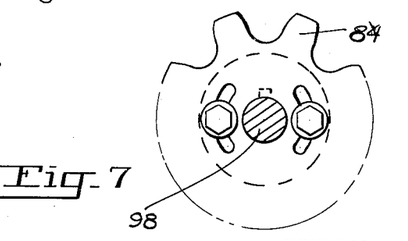
Figure 7 is a section, on the line 7—7 of Figure 2, showing adjusting means which may be incorporated in the feed means.

The feed table 9 is longitudinally recessed in its top and between its sides, to provide for feed means which include the feed chains 8. Two such chains are connected by cross bars 81, supporting upstanding feed lugs 82, and by cross bars 83. Further feed lugs 82 are carried by an additional chain 80 paralleling the chains 8, and adapted to engage and advance the tail portion of a fish. These chains, supported upon suitable sprocket wheels 84 upon drive shaft 98 and idler shaft 99, are adjustable relative to their shafts, as shown in Figure 7. Such adjustment serves to coordinate the time of arrival of the center line of a fish, regardless of its back-to-belly depth, which is advanced by the lugs 82 and the respective chains, at the beheading point, represented by the slots 90 in the feed table 9, which is the point where the path of the knife 91, rotatable about the axis 92, intersects the table top and the path of the fish's advance.

Such arrangements are in general old, and for a fuller description reference is made to certain of my copending applications identified above. As in those applications, the matter of proper registry of the fish at the time of arrival at the beheading point involves (a) its position in its path of advance, the adjustment of which is accomplished by adjustment of the sprocket wheels 84 relative to the shaft 98, (b) the time cycle of rotation of the header knife 91, which is normally unvarying, and (c) the disposition of the fish in the direction of its length, so that the beheading cut comes not ahead of and not materially behind the bony excrescences in the vicinity of the pectoral girdle, but substantially at those bony excrescences or immediately to the rear thereof. The latter adjustment involves shifting of the fish in the direction of its length, for it is not possible for the fish to be so fed and located upon the machine in feeding, that every fish will be in correct registry. Particularly is the latter true when it is understood that the fish is not placed directly upon the table 9 by hand, but rather is advanced thereto by indexing means, represented by the chains 85.

The fish can be fed, even by the indexing means represented by the chains 85, with reasonable accuracy, that is to say, accuracy within two or three inches in the direction of their length. If, therefore, they can be shifted in the direction of their length while they are advancing, disposed transversely of their length, towards the beheading point 90, to leave them before they reach the beheading point in correct registry therewith, then the problem of properly locating the fish has been solved. That solution, according to the present invention, is accomplished by supporting the fish, in part at least, by a plate or platform from beneath, so that, since the fish is in part supported upon the feed table, the plate will slide relative to the fish toward the fish's snout end, or, regardless of whether the fish is or is not given material support by the feeder table, the plate will slide relatively to the fish in the direction of the fish's tail end.

In the preferred form of the invention, shown in Figures 1 to 8 inclusive, the platform 1 is of the first type, that is to say, it is shiftable, transversely of the path of advance, first towards the snout end of the fish, and then tailwardly. Such a plate carries an upstanding edge 10, which is so formed as to slide over the skin and scales of the fish, which are somewhat slippery, as the plate moves toward the snout end of the fish, until the edge 10 engages behind the pectoral girdle or other similar bony excrescence in the same vicinity, and thereafter, so far as the plate 1 is shifted toward the fish's snout and, the fish itself is positively pushed in this direction. When the fish has been thus shifted toward its snout end, until it is in correct registry with the beheading point ahead of it, the plate 1 is then withdrawn tailward, but since the fish is slippery, and the movement now is in a sense which is not opposed by the fish's scales, and the fish is partly supported by the table itself, the plate moves relatively to the fish, but the fish does not move tailward. The plate, however, moves out of the way, so that by the time the fish advances to the beheading point 90 the platform 1 is out of the way, and the beheading cut can be made without danger of interference, and with the certainty that the fish is in proper registry.

Figure 9:
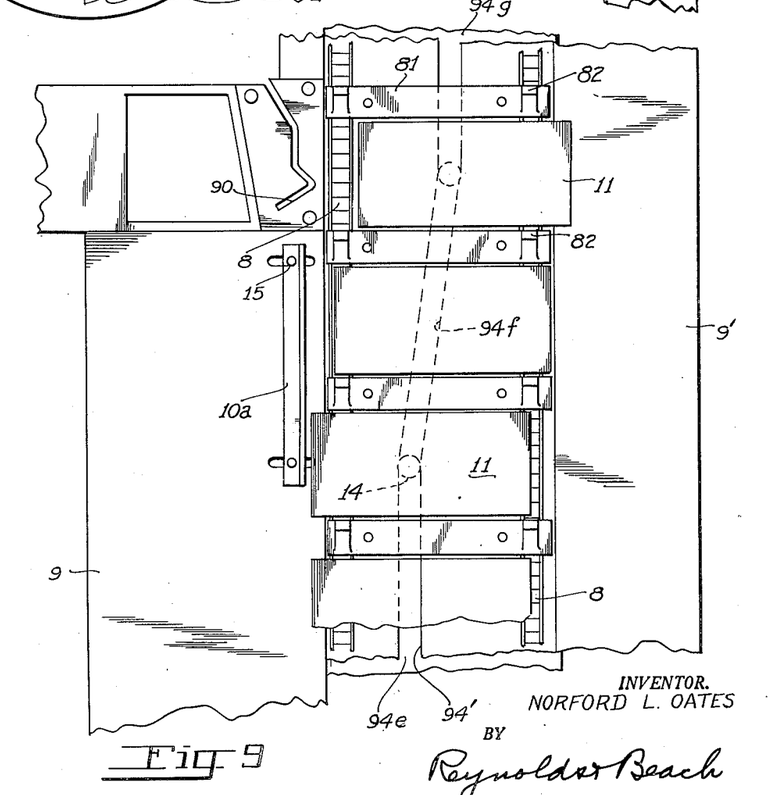
Figure 9 is a partial plan view, and Figure 10 a partial section similar to Figure 4, illustrating a modified form.
Figure 10:
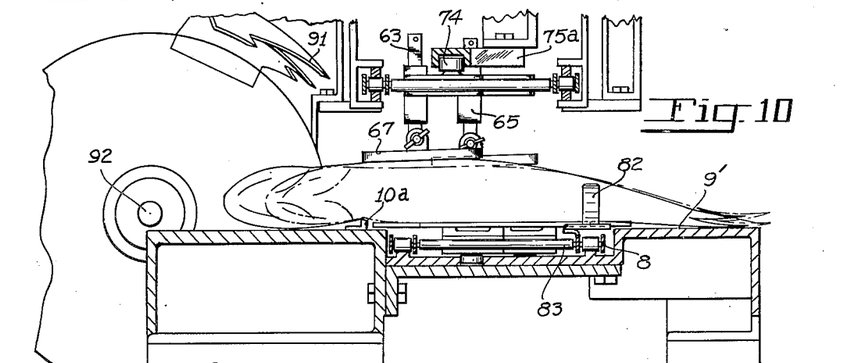

In the form shown in Figures 9 and 10, the platform 11 constitutes the major portion of the fish's support, so that in effect the fish is lifted or supported and moved, not toward its snout end, but wholly toward its tail end, until such time as its pectoral girdle or similar bony excrescence engages a fixed rail 10a, upstanding from the table and disposed parallel to the fish's path of advance. This halts further tailward movement of the fish, while not preventing its continued advance toward the beheading point, and the platform 11 is thus withdrawn until it is out of the way. Its withdrawal is of sufficient extent as to be certain that a fish which has the maximum misalignment is properly aligned before it has advanced to the beheading point.

The manner of effecting these movements may vary, and those shown herein are selected as representative. Thus the platform 1 is mounted upon a slide 12, which is slidable upon the guiding cross bars 83 which form, in effect, part of the feed mechanism. The platform is transversely adjustable with relation to the slide 12 by adjusting means such as are indicated at 13 in Figure 8, so that its upstanding edge 10 may be adjusted for proper location of the fish with relation to the beheading point. Carried by the slide 12 is a cam follower 14, and immediately beneath the upper run of the feed chains and the path of the carriage 12 is a cam track 94, within which the follower 14 rides. This cam track, best viewed in Figure 2, contains a straight portion 94a, a snoutward shifting incline 94b, and a reverse or retracting incline 94c, with a final straight portion 94d, aligned with the initial portion 94a. It is believed it will be self-evident how the plates 1, retracted to the limit toward the tail end of the fish as they first ride upon the feed end of the table 9, are eventually moved by the portion 94b of the cam toward the snout end of the fish, until such time as the upstanding edge 10 engages the fish's bony excrescence and moves the fish with the plate toward the snout end, and finally, when the limit of such snoutward shifting is reached, the fish is in proper registry with the beheading point, whereupon the platform 1 is retracted by the portion 94c, leaving the fish thus shifted. After beheading occurs the platform passes with the feed chains around the drive sprocket wheels 84, and along the under run of the feed chains, to enter again at the feed end of the table into the portion 94a.

It will not be necessary in all cases, but for somewhat greater certainty of shifting of the fish, it may be desirable in some cases to provide overhead means for paralleling the motion of the plate 1 and its fish-engaging member 10, and means to that end are shown. These means, in effect, are a duplication of the lower feed means, although they incorporate, in addition, hold-down means, and because of their overhead nature, require certain additional cam or track controls.

Supported in overhead brackets 93 of the frame, and in a hanger bracket 95 at one end, are chains 7 mounted upon sprocket wheels, such as the driving sprocket wheel 70 and the idler wheel 71. These chains are joined by connecting bars 72, which guide transverse slides 73, corresponding to the transverse slides 12. Through arrangements which will be described in detail hereafter, hoe-like members 6 are supported from the slides 73 and shift transversely with the latter. This transverse shifting is accomplished through the means of a cam followed 74 carried by the slide 73, the movement of which is controlled by a cam 75, which corresponds to and parallels the cam 94, so that the members 10 and 6 move always conjointly, and are located so as to engage, the one, the lower bony excrescence, and the other the upper one, of a fish which is laid upon the table.

The chains 7 are guided by guide means 97, so that they do not sag intermediate their ends, and so that the follower 74 will always remain in proper engagement with the cam 75.

Since the thickness of the fish will vary, it is necessary that the elements 6 be vertically self-adjusting, to accommodate different sizes of fish. These hoes 6 are adjustable at 60 in the direction of the length of the fish, relative to their immediate support 61, and this support 61 constitutes part of a lever rockable about an axis which is transverse to the length of the fish, the other arm 62 of this lever serving as a presser or leveling element engaging the fish toward its tail end. The rocking is with relation to an upright post 63, which carries cam follower roller 64, and which is itself slidable within a socket 65 in the slide 73. The rollers 64 ride upon semicircular tracks 96a and 96b at the ends of the overhead frame, so that the elements 6 are held sufficiently upraised at the feed end that they will drop upon a fish beneath them, and so that at the discharge end the rollers, which by now have dropped off the beheaded fish, will be raised again, and the posts 63 withdrawn into their sockets 65. Limit pins 66 limit extension of the posts 63, however.

It will be understood that the elements 10 and 6, engageable with the bony excrescence of a fish, are subject to variations in shape best adapting them for that purpose according to preference or under different conditions of use. As simply illustrated, they are formed of straight or non-contoured shape.

The various driving connections have not been described in detail, since they do not, in principle, depart from those of my former applications, and since they are shown in the drawings. The knife, the feed chains and the transverse shifting means are all interconnected and synchronized, to effect arrival of the line of the beheading cut on the fish at the beheading point at the instant the knife passes through that point.

The arrangement of parts in the form shown in Figures 9 and 10 is not greatly different from the arrangement already described. The platforms 11 are preferably of considerably greater area, relative to the fish, than the platforms 1, and assume a considerably greater portion of the load imposed by the weight of the fish, so that it is the engagement of the fish by the platforms 11 which is its primary support, rather than the table 9', as in the form previously described. The cam 94' has a straight entrance portion 94e, but the inclined portion 94f, which begins in the vicinity of the first-engaged end of the fixed rail 10a, causes movement of the platform 11 transversely away from the beheading point, rather than towards it, until finally, by the time the platform reaches the beheading point, it has been fully withdrawn, so that the cam follower 14 enters the plate portion 94g. In the meantime the underneath pectoral girdle or other bony excrescence of the fish has engaged the rail 10a, and tailward movement of the fish has stopped, though its advance by the feed lugs 82 continues. The platform 11 continues its transverse withdrawal, and before the time it comes uppermost on the table again it has been shifted into position where its follower 14 will enter the entrance portion 94e.

The overhead cam slot 75a is preferably similarly fashioned, when overhead means are employed. However, these overhead means differ from the overhead means of the previous form in that the element 67 is a presser element, to hold the fish downwardly to a sufficient extent that its pectoral girdle will engage the rail 10a, and the element 67 does not in any sense itself engage behind the upper pectoral girdle, nor constitute any part of the means for locating the fish in the direction of its length.

The rail 10a is considered as a fixed rail, but, it will be understood, this rail may be adjustable somewhat transversely, as is indicated at 15, so that it may be accurately located with respect to the beheading point 90, in accordance with the desires of different operators or packers.

I claim as my invention:

1. In combination with a header knife movable in a definite path, means to advance individual fish to be beheaded, disposed transversely of their path of advance, along an intersecting path, synchronized means interconnecting the knife and the fish-advancing means to traverse the fish's position with the knife as the fish arrives at the beheading point, a plurality of means each supporting an individual fish and constituting part of the fish-advancing means, means to shift each fish-supporting means, as it advances towards the beheading point, in a direction lengthwise of the fish, and means formed to engage behind the fish's pectoral girdle during such shifting, as a gauge to align the fish, in the direction of its length, correctly relative to the path of the beheading knife at the beheading point.

2. In combination with a header knife movable in a definite path, means to advance individual fish to be beheaded, disposed transversely of their path of advance, along an intersecting path, synchronized means interconnecting the knife and the fish-advancing means to traverse the fish's position with the knife as the fish arrives at the beheading point, a plurality of means each supporting an individual fish and constituting part of the fish-advancing means, means to shift each fish-supporting means, as it advances towards the beheading point, in a direction lengthwise of the fish, means formed to engage behind the fish's pectoral girdle during such shifting, as a gauge to align the fish, in the direction of its length, correctly relative to the path of the beheading knife at the beheading point, and a like number of further individual means above the fish's path, each formed to engage the fish's uppermost pectoral girdle, and means guiding said further means for movement along and transversely of the fish's path of advance, in a path duplicating the corresponding portion of the path of the lower fish-engaging means.

3. Fish locating means comprising, in combination with a header knife operable in a predetermined path which includes a beheading point, a plurality of means whereupon individual fish are supported, feed means operatively connected to said supporting means to advance them successively towards and past such beheading point in timed relationship to the beheading movement, means controlling said supporting means, as they advance, to shift them transversely of their path of advance, and means engageable pressingly with a bony excrescence in the vicinity of the fish's pectoral girdle, and coordinated with the feed means and the shifting means, to dispose each fish, when it arrives at the beheading point, in precise registry with the beheading knife, to effect beheading immediately behind the pectoral girdle.

4. Fish locating means comprising, in combination with a header knife operable in a predetermined path which includes a beheading point, a plurality of means whereupon individual fish are supported and each having an upstanding edge engageable behind a bony excrescence in the vicinity of the fish's pectoral girdle, feed means operatively connected to said supporting means to advance them successively towards and past such beheading point, in timed relationship to the beheading movement, and means controlling said supporting means, as they advance, to shift them transversely of their path of advance, to engage said upstanding edge with the bony excrescence of any fish not in correct registry with the beheading point, and to drag it towards its snout end into such correct registry not later than the arrival of the fish at the beheading point.

5. Fish locating means comprising, in combination with a header knife operable in a predetermined path which includes a beheading point, a plurality of means to support individual fish, feed means operatively connected to said supporting means to advance them successively towards and past such beheading point, in timed relationship to the beheading movement, means controlling said supporting means, as they advance, to shift them transversely of their path of advance, towards the tail end of the fish, and an upstanding rail disposed along the path of advance in position to engage behind the bony excrescence of each fish in the vicinity of its pectoral girdle, to halt further shifting tailward of each fish so engaged, said rail being so located, relative to the beheading point, as to leave each such fish in correct registry for beheading upon its arrival at the beheading point.

6. In combination with a feeder table affording partial support for individual fish as they advance while disposed upon the table transversely to their path of advance, and with a header knife operable in a predetermined path which includes a beheading point, feed means disposed lengthwise of the table, a plurality of individual fish supporting plates operatively engaged with and spaced apart along said feed means for advance along said table, said plates being located in the general plane of the table to afford the remainder of the support for each fish, means to effect shifting of each plate, as it advances, transversely of its path of advance, and means upstanding in position to engage each fish behind the bony excrescence in the vicinity of its pectoral girdle, to effect shifting of such fish transversely of its path of advance by shifting of its supporting plate, said latter means being so located and coordinated with the beheading point as to leave such fish in correct registry therewith.

7. In combination with a feeder table affording partial support for individual fish as they advance while disposed upon the table transversely to their path of advance and with a header knife rotatable in a predetermined path which includes a beheading point where the knife's path intersects the fish's path of advance, a plurality of individual fish-supporting plates spaced apart and guided for advance, in the general plane of the table, towards and past the beheading point, and each affording the remainder of the support for its fish, feed means timed with the header knife for thus advancing said plates, means to shift each plate, as it advances and prior to reaching the beheading point, transversely of its path of advance and towards the fish's snout end, and then reversely, and an upstanding edge carried by each plate, in position to engage behind the bony excrescence of the supported fish which lies in the vicinity of the pectoral girdle, and thereby to shift any misaligned fish towards its snout end into registry with the beheading point, and to leave the same in such registry, supported by the feeder table, upon reverse movement of the plate.

8. In combination with a feeder table affording partial support for individual fish as they advance while disposed upon the table transversely to their path of advance, and with a header knife rotatable in a predetermined path which includes a beheading point where the knife's path intersects the fish's path of advance, a plurality of individual fish-supporting plates spaced apart and guided for advance, in the general plane of the table, towards and past the beheading point, and each affording the remainder of the support for its fish, feed means timed with the header knife for thus advancing said plates, means to shift each plate, as it advances and prior to reaching the beheading point, transversely of its path of advance and towards the fish's tail end, and an upstanding rail, generally paralleling the fish's path of advance, fixed upon the feeder table in position to engage beneath and behind the bony excrescence in the vicinity of the pectoral girdle, to halt further tailward shifting of the fish with its plate, said rail being so located relative to the beheading point as to leave each fish so engaged in correct registry with the beheading point.

9. In combination, a feeder table, a header knife rotatable in a predetermined path which intersects the path of advance of fish along said table at a beheading point, feed means timed with said header knife to advance individual fish, each disposed on its side and transversely of its path of advance, along said feeder table to and past such beheading point, to reach that point as the knife moves therethrough, means carried by said feed means to partially support and to shift each individual fish, relative to said feed means, transversely of its path of advance, and means engageable behind the bony excrescence in the vicinity of each fish's pectoral girdle, and so coordinated with the fish-supporting means and the beheading point as to leave each fish, as a result of such engagement, in correct alignment with the beheading point.

10. The combination of claim 9, characterized in that the fish-engaging means is formed upon each fish-supporting means, and further characterized in the provision of a fixed cam means engaged by said fish-supporting means, formed to shift the latter first towards the fish's snout end, and then reversely, to leave the fish at its point of farthest shifting, prior to its reaching the beheading point.

11. The combination of claim 9, characterized in that the fish-engaging means is disposed alongside the fish's path of advance, and further characterized in the provision of a fixed cam means engaged by said fish-supporting means, formed to shift the latter towards the fish's tail end, to effect engagement of the fish, by such tailward movement, with the fish-engaging means, and thereby to locate the fish, as it continues its advance, in registry with the beheading point.

12. The combination of claim 9, including further fish-engaging means supported above the fish's path, and means to guide said upper fish-engaging means for movement, in engagement with the fish, in a path paralleling said fish-supporting means.

13. In combination, a feeder table, a header knife rotatable in a predetermined path which intersects the path of advance of fish along said table at a beheading point, feed chains supported for movement lengthwise of the feeder table, and generally in its plane towards and past the beheading point, platforms spaced therealong and guided thereon for transverse shifting, cam means fixed along the path of said platforms and engaged therewith to effect such transverse shifting, an edge upstanding from each platform, engageable behind the pectoral girdle of a fish laid in part upon said platform, to shift the fish towards its snout end until it is in correct registry with the beheading point, and fish-advancing means carried by said feed chains, engageable behind each fish to advance it towards and past the beheading point.

14. In combination, a feeder table, a header knife rotatable in a predetermined path which intersects the path of advance of fish along said table at a beheading point, feed chains supported for movement lengthwise of the feeder table, and generally in its plane towards and past the beheading point, platforms spaced therealong and guided thereon for transverse shifting, cam means fixed along the path of said platforms and engaged therewith to effect such transverse shifting, an element upstanding from each platform, engagebale behind the pectoral girdle of a fish laid in part upon said platform, to shift the fish towards its snout end until it is in correct registry with the beheading point, fish-advancing means carried by said feed chains, engageable behind each fish to advance it towards and past the beheading point, further chains paralleling said feed chains above the fish's path of advance, depending fish engaging means, cooperable with said platforms individually, supported from said upper chains for advance therewith, for transverse shifting, and for vertical movement to accommodate fish of varying size, and formed similarly to said upstanding elements to engage behind the upper pectoral girdle of an advancing fish, and cam means operatively engaged with said upper fish-engaging means, and formed to effect their transverse shifting in parallel relationship to the cooperable lower fish-engaging means.

15. In combination with a header knife movable in a definite path, means to advance individual fish to be beheaded, disposed transversely of their path of advance, along an intersecting path past a beheading point, synchronized means interconnecting the knife and the fish-advancing means to traverse the fish's position with the knife as the fish arrives at the beheading point, means to shift each fish not already aligned with the beheading point, as it advances towards that point, in a direction lengthwise of the fish, means formed to engage behind the fish's pectoral girdle during such shifting, as a gauge to align the fish, in the direction of its length, correctly relative to the beheading point, and a fish-restraining means advancing with each fish, and engaging the same tailwardly of the pectoral girdle, before and during its passage of the beheading point.

16. In combination with fish feeder means operable to support and advance individual fish laid thereon in spaced-apart parallel relation, successively, transversely of their length, toward a beheading point, individual fish engaging members disposed above said feeder means and adapted to rest upon individual fish supported on said means, means movably mounting said members for synchronized advance with fish engaged thereby between points located ahead of and beyond the beheading point, and deflecting means extending along the line of advance, cooperating with said mounting means operatively to deflect said members passing said deflecting means, first snoutwise of each fish to engage its pectoral girdle, to shift the respective fish so engaged into correct alignment with the beheading point, and then back, to withdraw such members from the pectoral girdle of the fish, but not the fish, in advance of their reaching the beheading point.

17. The combination defined in claim 16 wherein the mounting means comprises a continuous movable member disposed above and generally parallel with the line of advance of the fish, and transverse guides carried by such continuous member at spaced locations lengthwise thereof, operable to support the individual fish engaging members for shifting lengthwise of said guides and transversely of the line of advance.

18. The combination defined in claim 16 wherein the deflecting means comprises cam means and a cam follower connected to each fish engaging member, and adapted to operatively engage said cam means for deflection of such member during advancing movement of the same.

19. The combination defined in claim 16 wherein the continuous member comprises an endless chain, and sprockets operatively supporting such chain for rotation in a generally vertical plane substantially parallel to the line of advance, the upper stretch of such chain carrying the fish engaging members in inverted position along a return path, to return such members for reengagement of fish on the feeder means.

20. In combination with a feed table extending from a feed end to a delivery end, a beheading knife located at one side of and rotative past the plane of the table at a beheading point intermediate such feed and delivery ends, means synchronized with the knife to advance individual fish, supported by the table, and disposed crosswise thereon with their snouts all towards the beheading point, positively and continuously along the table, fish-locating means guided and synchronized to travel with each fish along the table, and arranged to rest upon each individual fish and to depress its skin behind and thus to engage the pectoral girdle, means operable upon each fish-locating means during such advance to shift it snoutward into definite linear relationship to the beheading point, and, by its engagement with the fish's pectoral girdle, to locate the fish in linear registry with the beheading point, and thereafter operable to withdraw the fish-locating means without disturbance of the attained position of the fish, and means to return said fish-locating means to an initial point for reengagement of fish, along a return path overlying their path of travel with the fish on the table.

21. In combination with fish feeder means operable to support and advance individual fish laid thereon in spaced-apart parallel relation, successively, transversely of their length, toward an operating point, individual fish engaging members disposed above said feeder means and adapted to rest upon individual fish supported on said means, means movably mounting said members for synchronized advance with fish engaged thereby between points located ahead of and beyond the operating point, and deflecting means stationed ahead of the operating point, cooperating with said mounting means operatively to deflect said members passing said deflecting means, laterally of their line of advance, to shift the respective fish engaged thereby into correct alignment with the operating point, as gauged by reference to the rear boundary of the pectoral girdle on each fish so shifted.

NORFORD L. OATES.

REFERENCES CITED

The following references are of record in the file of this patent:

UNITED STATES PATENTS

| Number    | Name   | Date          |
|-----------|--------|---------------|
| 1,042,165 | Spotz  | Oct. 22, 1912 |
| 1,222,926 | Brierly| Apr. 17, 1917 |
| 1,537,574 | Baader | May 12, 1925  |